United States Patent [19]

Meltsch et al.

[11] Patent Number: 5,199,724
[45] Date of Patent: Apr. 6, 1993

[54] MATCHING SEAL ELEMENT FOR CLOSING AN OPENING IN A CABLE FITTING OR PIPE LINE

[75] Inventors: Hans-Juergen Meltsch, Schwerte; Wolf Kluwe, Hagen, both of Fed. Rep. of Germany

[73] Assignee: RXS Schrumpftechnik-Garnituren GmbH, Fed. Rep. of Germany

[21] Appl. No.: 645,495

[22] Filed: Jan. 24, 1991

[30] Foreign Application Priority Data

Feb. 9, 1990 [DE] Fed. Rep. of Germany ....... 4004009

[51] Int. Cl.⁵ .................... F16J 15/00; B65D 59/06
[52] U.S. Cl. .................... 277/237 R; 277/101; 277/DIG. 10; 138/96 T; 138/96 R
[58] Field of Search .................... 277/277 R, DIG. 10, 277/101, 117, 118, 119, 128, 212 R, 212 C; 138/89, 96 R, 96 T, 108

[56] References Cited

U.S. PATENT DOCUMENTS

| | | | |
|---|---|---|---|
| 2,156,221 | 4/1939 | Kahn et al. | 138/96 T |
| 2,167,235 | 7/1939 | Engstrom | 138/96 T |
| 3,254,153 | 5/1966 | Kohler | 277/101 |
| 3,713,463 | 1/1973 | Bywater, Jr. | 138/96 R |
| 3,848,074 | 11/1974 | Channell | 277/DIG. 10 |
| 4,100,827 | 7/1978 | Flemming | 138/96 R |
| 4,538,021 | 4/1984 | Williamson, Jr. | |
| 4,630,646 | 12/1986 | Koehle | 138/96 T |
| 4,694,118 | 9/1987 | Schmidt | |
| 4,702,645 | 10/1987 | Skinner et al. | 277/101 |
| 4,786,272 | 11/1988 | Baker | 277/212 FB |
| 4,830,060 | 5/1989 | Botsolas | 138/149 |

FOREIGN PATENT DOCUMENTS

| | | |
|---|---|---|
| 0392266 | 3/1990 | European Pat. Off. |
| 0440903 | 11/1990 | European Pat. Off. |
| 3804497 | 2/1988 | Fed. Rep. of Germany |
| 0684106 | 6/1930 | France .......... 277/DIG. 10 |
| 1334993 | 5/1962 | France |
| 2623666 | 11/1988 | France |
| 8203888 | 10/1982 | Netherlands |
| 969078 | 4/1962 | United Kingdom |

Primary Examiner—William A. Cuchlinski, Jr.
Assistant Examiner—Daniel G. DePumpo
Attorney, Agent, or Firm—Hill, Steadman & Simpson

[57] ABSTRACT

A matching seal element for closing an introduction opening in a cable fitting, tubing or similar elongated article including matching the diameter to the diameters of introduced articles, by a terminal wall which is formed of concentric, removable sealing rings. The matching seal element is longitudinally divided and may be tightly clamped on sockets or pipes or on a dowel-like expandable receptacle which is spread in openings.

24 Claims, 6 Drawing Sheets

MATCHING SEAL ELEMENT FOR CLOSING AN OPENING IN A CABLE FITTING OR PIPE LINE

BACKGROUND OF THE INVENTION

1. Field of the Invention

The present invention is directed generally to a matching seal element for closing an introduction opening of a cable fitting, pipe line or the like and, more particularly, to a matching seal element with concentrically arranged sealing rings.

2. Description of the Related Art

Gases or liquids, such as water, can spread into the open ends of pipe lines, conduits, cable housings, and other similar elongated articles, whether the pipe lines and the like are empty or occupied. To prevent the entry of water and gases into these elongated elements, various means including shaped rubber parts, shrink preforms or spreadable tube inserts, for example, have previously been introduced into the introduction openings of these elongated articles. For example, shaped members having lamellae are introduced in succession into these pipe inserts, as disclosed in German Patent Application 39 12 179.8. The introduction openings must be cut out with special tools having an appropriate diameter. This requires not only special tools but also special technical knowledge.

U.S. Pat. No. 4,694,118 discloses a cable sleeve in which elastic seal inserts that are formed of concentrically arranged rings are used in the front-end seal members. The rings are removed to conform to the required introduction diameter and, by interacting with the actual seal member with which the required sealing pressure is generated, a seal is formed within a special cable sleeve. This seal system, however, cannot be utilized to close pipe sockets or similar openings.

SUMMARY OF THE INVENTION

An object of the present invention is to provide an independent, matching seal element for an introduction opening of cables pipe lines, or similar openings, whereby a matching of the diameter for introduced articles such as, for example, cables is possible in a simple way. This and other objects and advantages of the invention are achieved by a matching seal element having sealing rings interconnected at one side to form a cylindrical, closed terminating wall. The terminating wall is firmly integrated in a cylindrical shaped part to close one side thereof. The cylindrical shaped part is radially slotted along a generated line and along the terminating wall. Closure elements for accepting a clamp element are formed along the longitudinal portion of the radial slot, and the open end of the cylindrical shaped part is provided with a shoulder and/or seal elements for joining to a receptacle portion of the introduction opening.

A main advantage of the invention over the prior art is that an independent preform is provided in which all necessary parts are combined. The sealing of the opening to be closed is undertaken at the one side of the cylindrical shaped part, whereas a seal matched to the introduced article, for example a cable, ensues at the second side. Under certain circumstances, additional sealing measures at the introduced article may be undertaken in the middle part of the cylindrical part, whereby protection is also then simultaneously established there.

The shaped cylindrical part of the present invention is longitudinally divided and thus may be applied over elongated articles that are already laid so that, for example, it is possible with the present device to seal off a cable pipe line subsequent to it having been laid. Due to the simple nature of the integrated matching of the present seal, introduction openings are respectively correspondingly produced completely without problems and without the use of special tools. The matching seal element of the invention can thus be applied tightly by simply being clamped onto a corresponding socket or onto a dowel-like projection which has been introduced into the opening. The matching seal element, or at least sub-regions thereof, are composed of an elastomeric material and preferably of neoprene or styrene-butadiene rubber (SBR).

Additional sealants such as, for example, known plastic sealing compounds or sealing pastes may be introduced into the sealing regions. Pull-in striae or similar damage to the cable surfaces may be compensated and reliably sealed in this way. The term "pull-in striae" refers to minute, longitudinally extending striae (minute grooves or channels) that arise when a cable is slid over a surface or wallportion of the seal as it is pulled in the seal housing, for example. The sealing regions are closed using corresponding clamp means that are either integrated therewith or separately provided. An additional receptacle space may also be created with the length of the cylindrical shaped part, this additional receptacle space being lent a certain additional flexibility under certain circumstances by being formed with corrugations or as a bellows to be able to compensate for bending or torsional stresses. Sealing zones are thereby relieved of mechanical stresses.

BRIEF DESCRIPTION OF THE DRAWINGS

The invention shall now be set forth in greater detail with reference to the figures.

DETAILED DESCRIPTION OF THE PREFERRED EMBODIMENTS

Figure 1:
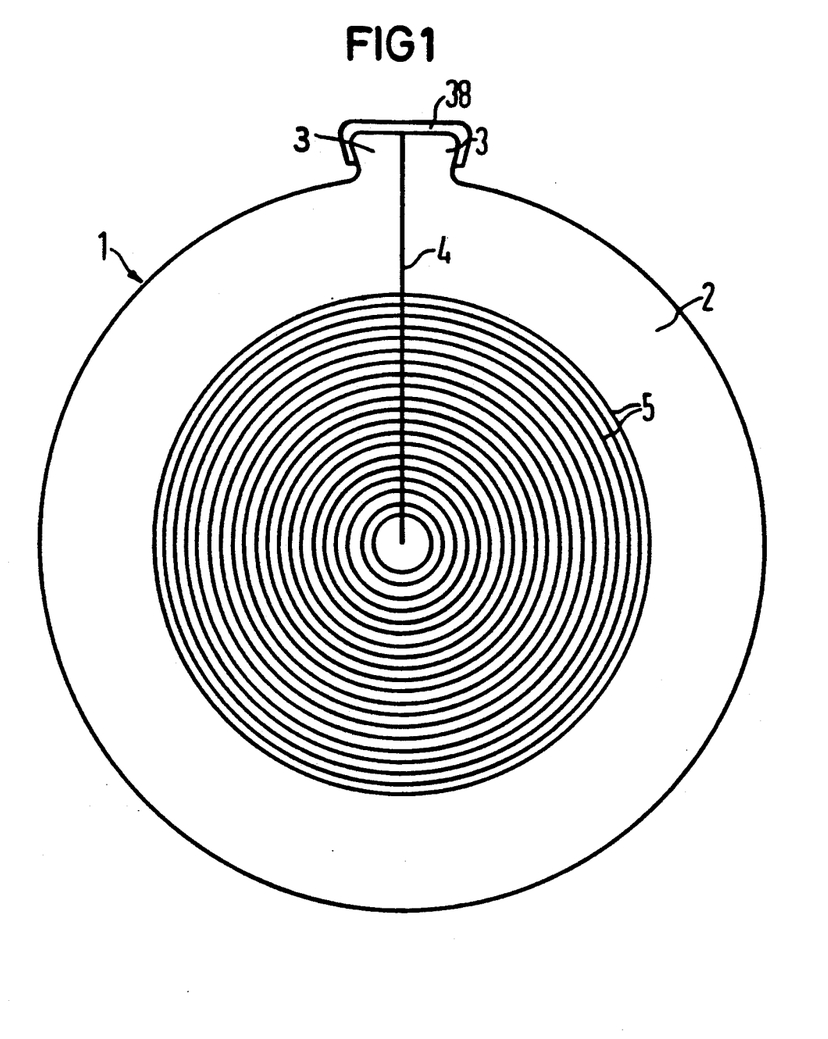
FIG. 1 is a front view of an introduction side of a matching seal element in accordance with the principles of the present invention.

A front view of a matching seal element 1 according to the present invention is shown in FIG. 1, which includes a terminal wall 2. Concentric parting cuts are provided in the terminal wall 2 of the seal element 1 so that a number of individual seal rings 5, respectively, are formed between the cuts. These parting cuts do not extend entirely through the terminal wall 2, but instead leave short material webs remaining via which the individual sealing rings 5 are interconnected, thereby guaranteeing a uniformly closed terminal wall 2. As needed, the sealing rings 5 are removed, such as by being cut out, and may preferably be torn out of the terminal wall to leave an opening of the required diameter to match the outside diameter of the introduced articles.

After an introduction opening has thereby been produced by removal of the rings 5, the matching seal element 1 is applied over the article to be introduced, such as a cable for example, by being opened. Opening is accomplished by splitting the seal element 1 along a radial slot 4 which also continues longitudinally to divide bead-shaped closure elements 3 formed on the seal element 1. Subsequently, the longitudinal slot 4 is closed by a closure means elements 3. The closure means may be in the form of a clamp rail 38, for example, that is slipped over the bead-shaped closure elements 3 of the formed seal element 1 in a clamping fashion. As a result of this operation, a tight closure of the opening left by the removal of the rings 5 about a pipe, cable sleeve, or the like to be sealed simultaneously occurs.

Figure 2:
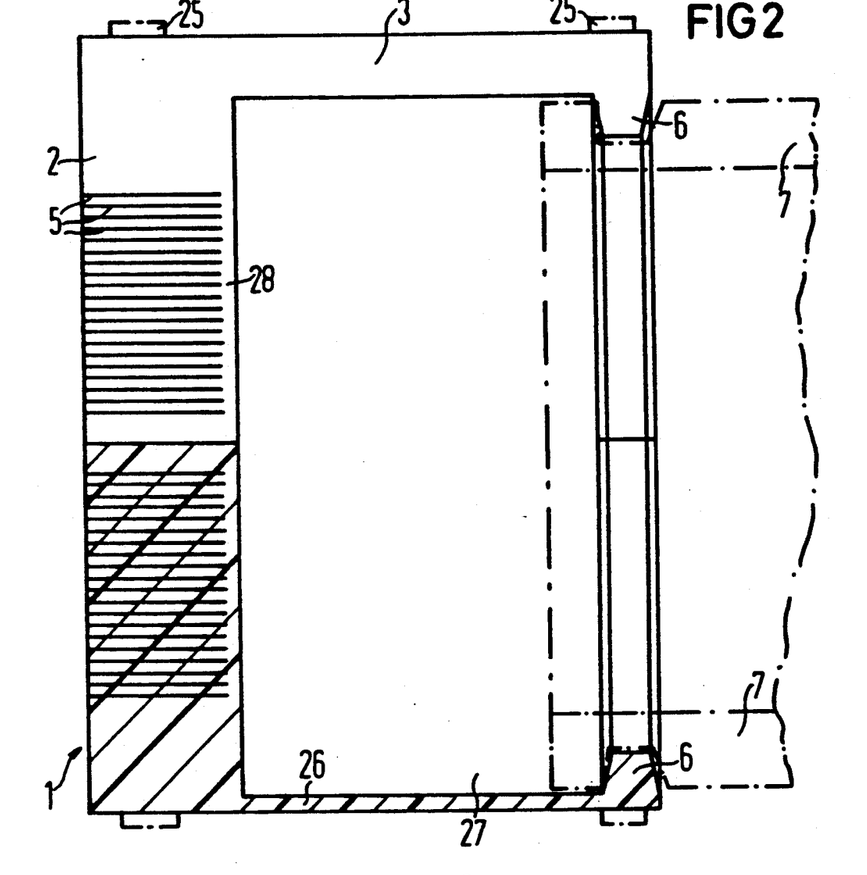
FIG. 2 is a longitudinal section through the matching seal element of FIG. 1 taken along a radial slot.

FIG. 2 shows the matching seal element 1 in a longitudinal section in the plane of the radial and longitudinal slot 4. The relatively thick terminal wall 2 at one end of the seal element with the slits forming the concentric rings 5 can be seen, as well as the web 28 which links them together. The matching seal element 1 has a cylindrical shaped part 26 extending from the wall 2 which includes, for example, an inwardly directed, all around shoulder element 6 at an end opposite the terminal wall 2. The shoulder element 6 provides slip-free anchoring in a channel or behind a ridge which is close to an end opening of a pipe 7, as shown in phantom. An additional seal may be provided under certain circumstances in the corresponding sealing and parting surfaces with appropriate sealants such as, for example, a mixture of polyisobutylene, butyl rubber and suitable additives. A receptacle space 27 in which additional measures, such as additional seals, may be potentially undertaken lies between the shoulder element 6 for anchoring and the terminal wall 2. A contemplated variation of the present device provides that the wall of the cylindrical shaped piece 26 in the region of the receptacle space 27 is formed bellows-like or corrugated, as mentioned above. This increases the flexibility as needed and reduces stress on the seal.

In addition to the use of the clamp rail 38, the matching seal element may also be closed through the use of all around tightening straps 25, shown in phantom, and corresponding clamping devices, which under certain circumstances can be merged with the longitudinal closure elements, such as the clamp rail 38, which embrace the bead-shaped closure elements 3. Closure of the seal element, however, can also be by the use of a packing that embraces the entire matching seal element 1 so that additional protection of the seal is thereby provided. In such case, the actual closure elements are then expediently arranged along the packing.

Figure 3:
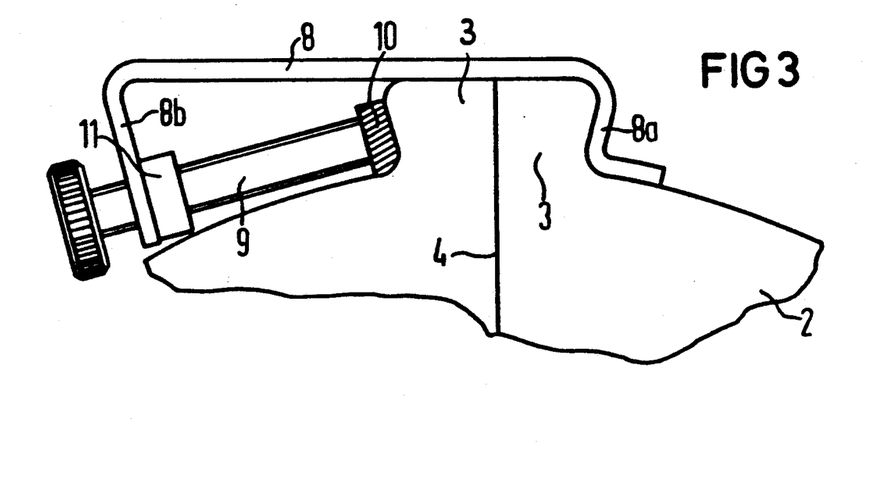
FIG. 3 is an enlarged elevational view of a first closure system for closing the radial slot of the present seal element using a screw element.

With reference to FIG. 3, a clamp strap 8 is provided which is matched in shape to the bead-shaped closure elements 3 that proceed along both sides of the longitudinal slot 4. The clamp strap 8 has one bent leg 8a which is matched in shape to the under-cut shape of one of the longitudinal closure elements 3 and is supported against the side wall thereof. A second leg 8b includes a pressure screw 9 which is introduced into a threaded block 11 that enables a die 10 to be pressed against the second closure element 3 with the pressure screw 9. The longitudinal slot 4 is thus kept under an appropriate closing pressure.

Figure 4:
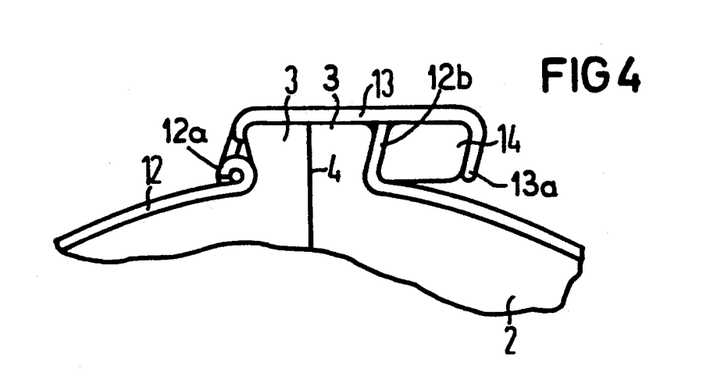
FIG. 4 is an enlarged elevational view of a snap-on closure embodiment using a wedge bracing for closing the radial slot of the matching seal element.

In FIG. 4, a tightening strap 12 is arranged around the critical regions of the matching seal element 1, for example as shown by the straps 25 of FIG. 2. A longitudinally extending angle plate 13 that is connected to the tightening strap 12 in articulated fashion by a hinge 12a at one side is then arranged in the region of the longitudinal closure elements 3. A second end 12b of the tightening strap 12 is angled against the other closure element 3 as an abutment. After the angle plate 13 has been folded over, the necessary closing pressure in the closure region is produced either directly or, as shown in FIG. 4, via an additional clamping wedge 14 mounted between the end 12b and an angled leg 13a of the angle plate 13.

Figure 5:
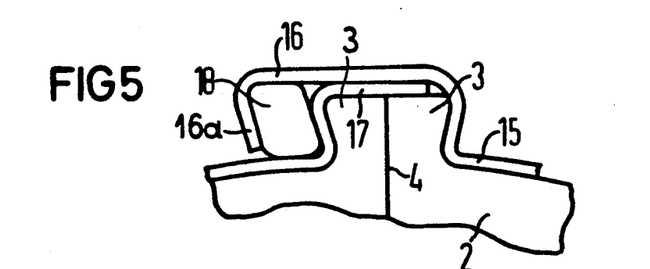
FIG. 5 is an enlarged elevational view of another closure embodiment with a wedge bracing.

FIG. 5 shows an embodiment in which the articulation is forgone in the longitudinal closure means. Here, both ends of a tightening strap 15 are matched to the side walls of the closure elements 3. An end 16 is formed in the strap 15 overlapping the elements 3 and is angled-off such that a clamping wedge 18 is again introduced between an angled portion 16a and a first end 17 of the tightening strap 15.

Figure 6:
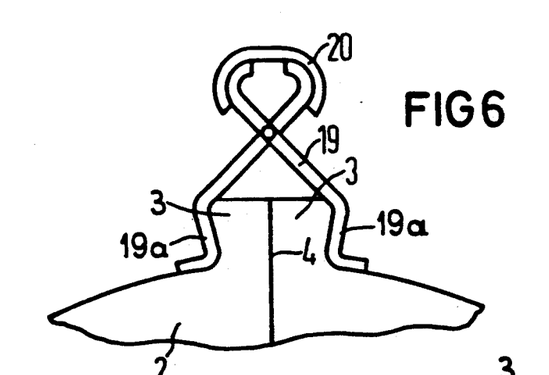
FIG. 6 is an enlarged elevational view of yet another closure having a tong-like element.

A tong-shaped clamp element 19 for longitudinally closing the slot 4 is shown in FIG. 6. The closure elements 3 are embraced by matched arms 19a of the tongs 19, and the tongs are fixed with the required clamping pressure by a locking clamp 20 embracing an opposite end of the tongs 19.

Figure 7:
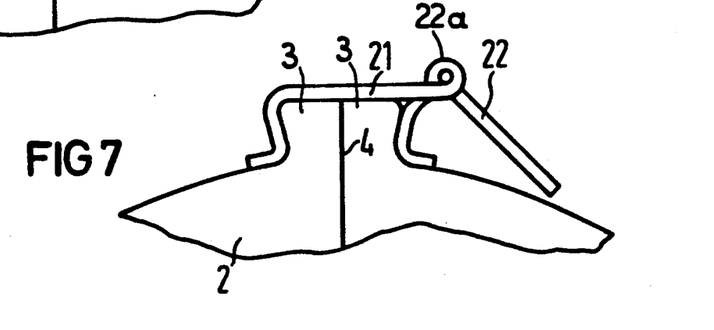
FIG. 7 is an enlarged elevational view of a toggle closure embodiment.

A further embodiment of the closure means for the longitudinally proceeding closure elements 3 is shown in FIG. 7. A clamp or toggle closure 21 and 22 is employed here. One closure part 21 embraces one of the closure elements 3 and bridges the longitudinal slot 4. A toggle-like closure element 22 is fixed against a second one of the closure elements 3 via an articulation-like connection 22a in clamping fashion by applying a force. By appropriately shaping the closure parts 21 and 22, the locking of the closure means ensues by interacting with the undercuts of the closure elements 3.

Figure 8:
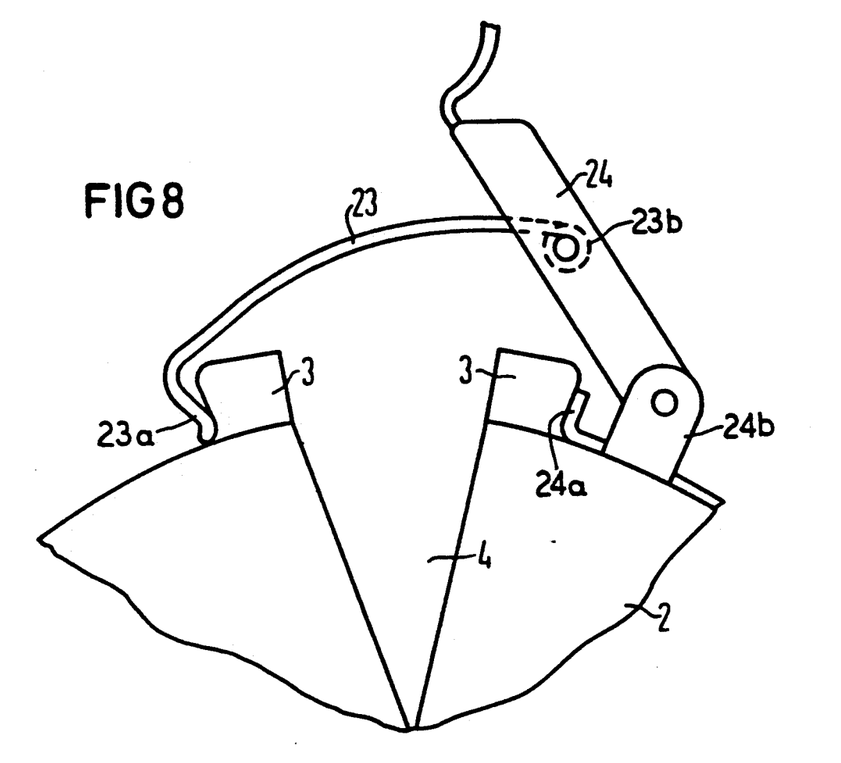
FIG. 8 is an enlarged elevational view of a snap-on closure embodiment shown in its opened condition.
Figure 9:
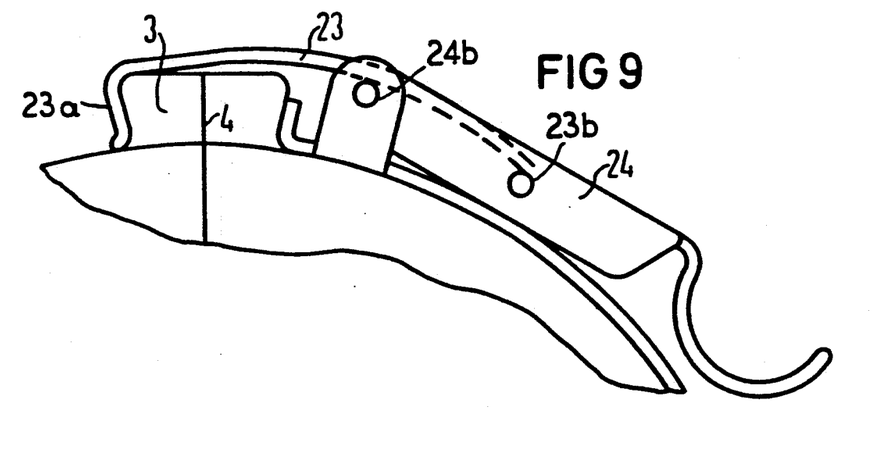
FIG. 9 is a view of the snap-on closure of FIG. 8 shown in its closed condition.

A snap-on closure apparatus 23 and 24 is shown in FIG. 8 in its opened position. Here, a clamp element 23 has an angled-off portion 23a which embraces the first closure element 3 at its undercut side wall. The other end of the clamp element 23 is rotatably seated at a hinge 23b in a tension lever 24. The tension lever 24 is supported on an angle 24a behind the second closure element 3 and by a second hinge 24b. When the clamping lever 24 is thrown, the two closure elements are pulled toward one another and are pressed together in sealing fashion with appropriate pressure. This ultimate sealed condition is shown in FIG. 9, wherein the hinges 23b and 24b are in an over-center position to hold the slot 4 closed.

Figure 10:
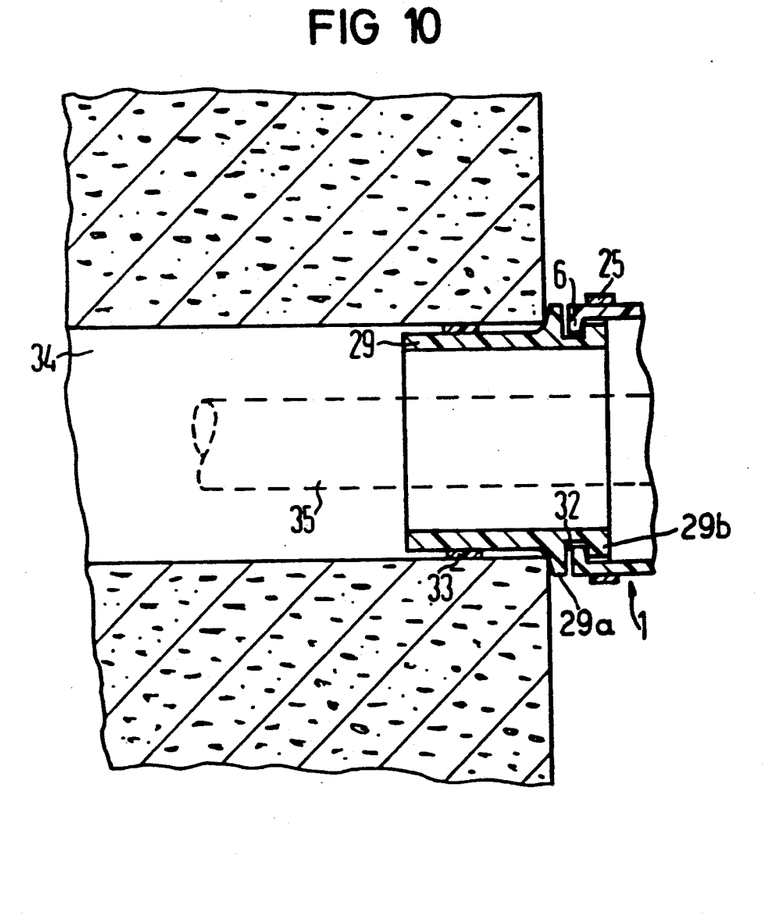
FIG. 10 is a cross section showing an introduction opening of a bore in a solid member into which a receptacle in the form of a spreading dowel, or expandable fitting, for the present matching seal element is inserted.

FIG. 10 shows the shaft wall of a cable shaft into which a lead-through opening 34 is introduced. The lead-through opening 34 is to be closed using the apparatus of the invention, whereby it is initially of no significance whether the opening is free or whether it is occupied by a cable 35 as shown in phantom. A receptacle in the form of a spreading dowel, or expandable fitting, 29 for mounting the matching seal element 1 with which a seal relative to the wall of the opening is produced is inventively introduced into the lead-through opening 34. The spreading dowel 29 is longitudinally divided, although not visible in this view, and is spread after being introduced into the opening. The annular gap around the dowel 29 is sealed via a ring seal 33 placed between the wall and the spreading dowel 29. The spreading dowel 29 is pushed into the opening up to a detent formed by a supporting ring 29a and can then be fixed in place. The spreading dowel 29 has an outwardly projecting rim or catch ring 29b at the outside of the end, forming, for example, an all around annular groove 32 at its outermost end. The catch ring 29b can alternately be some other form of catch element.

The actual closure of the opening 34 is accomplished by the above-described matching seal element 1 that, as needed, is provided with introduction openings in its terminal wall 2 to accommodate the cable 35. The seal element 1 is engaged into this annular channel 32 with the corresponding shoulder element 6. The matching seal element 1 is clamped fast to the spreading dowel with the assistance of the foregoing closure elements, for example, having the tightening straps 25.

Figure 11:
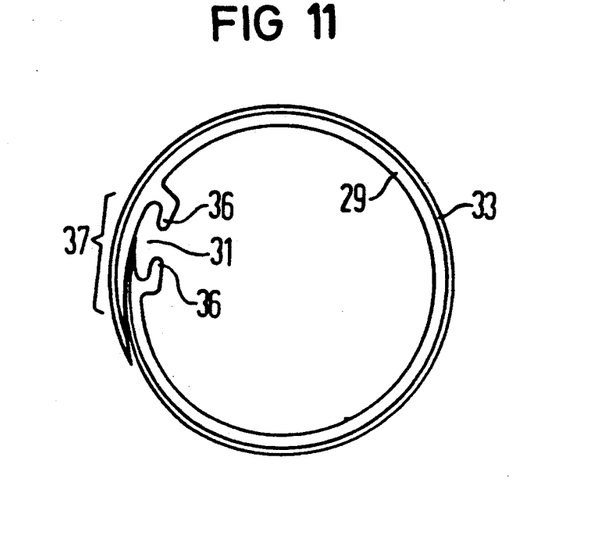
FIG. 11 is a front view of the spreading dowel, or expandable fitting, of FIG. 10.

The formation of the receptacle for the matching seal in the form of the spreading dowel 29 is now set forth in a front view in FIG. 11. As may seen, the spreading dowel 29 is fundamentally formed as a cylindrical shaped member that is slotted once in a longitudinal direction. The two edges along this slot mutually overlap one another by an overlap distance 37 that is sufficient that an adequate overlap for sealing is still present even when spread to the largest diameter. The seal ring 33 on the outside of the spreading dowel 29 thus yields the seal vis-a-vis the surrounding wall of the lead-through opening 34. To spread the spreading dowel 29, channel projections 36 are arranged, on the inside surface of the hollow-dowel 29 along the two longitudinal edges so that two channels are formed whose openings reside opposite one another. A double spreader channel 31 into which a correspondingly elongated spreader element may be driven thus arises between the channel extensions 36 in this way. By driving in a spreader element, the diameter of the spreading dowel 29 is enlarged and the annular seal 33 thereby pressed outward against the wall of the lead-through opening 34. The matching of the diameter of the spreading dowel 29 to the diameter of the lead-through opening 34 ensues on the basis of an appropriate selection of a spreader element which is correspondingly broad or narrow depending upon the particular demands.

Figure 12:
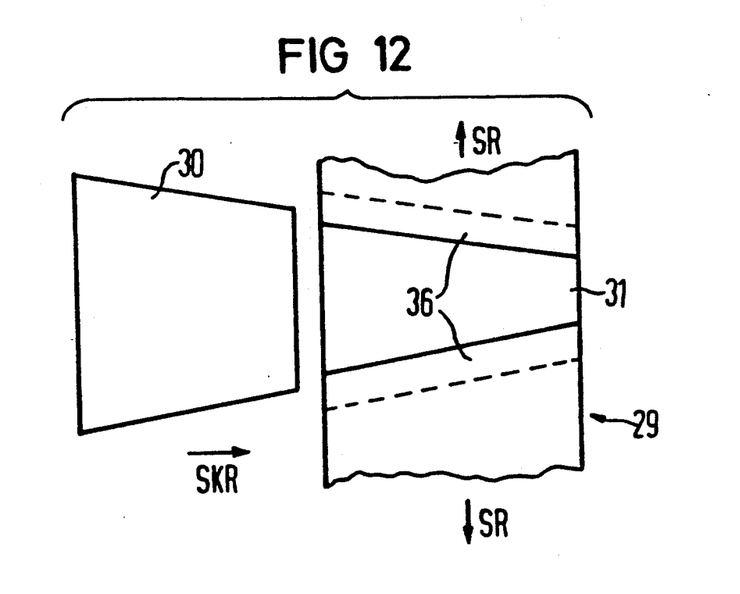
FIG. 12 is a schematic view showing the action of the spreader wedge in the spreading dowel.

In FIG. 12 is illustrated the spreading event of the spreading dowel or expandable fitting by appropriate arrows. The arrow SKR illustrates that a preferably conical spreader wedge 30 is introduced or driven into the spreader channel of the straddling dowel 29. The spreader channel 31 is likewise preferably conically formed. During this procedure, the spreading dowel 29 is driven apart in the direction of the arrows SR and is pressed against the outer containment wall of the lead-through opening 34 to produce a seal.

The matching element 1, however, can be coupled arbitrarily to other receptacles since this is dependent on the type of fashioning of a corresponding tube sealing insert only with respect to its diameter.

It will be apparent that various modifications and/or additions may be made in the apparatus of the invention without departing from the essential feature of novelty involved, which are intended to be defined and secured by the appended claims.

We claim:

1. A matching seal element for closing an opening, comprising:

a cylindrical closed terminal wall formed of interconnected seal rings, said seal rings being interconnected at one side of said terminal wall;

a cylindrically shaped part firmly integrated to said terminal wall so that said terminal wall closes one side of said cylindrically shaped part, said cylindrically shaped part defining a radial slot along a generated line and along said terminal wall, said cylindrically shaped part having an open end including a seal forming element, and clamp means for closing said radial slot, said clamp means comprising:

raised beads extending along both sides of said radial slot, and means for securing said raised beads together, said means for securing including a clamp rail mounted on said raised beads to hold said raised beads in abutment;

a receptacle means for fitting into an introduction opening, said receptacle being fastenable to said seal forming element, said receptacle means comprising:

a spreadable dowel-like element, a seal arranged between said dowel-like element and a wall of said introduction opening, and means for affixing to said seal forming element of said cylindrically shaped part on an end of said dowel-like element that projects outwardly from said introduction opening;

a sealant between said receptacle means and said introduction opening for sealing;

a spreader wedge mounted in said dowel-like element to spread said dowel-like element in said introduction opening, said spreader wedge being of a wedge shape in a longitudinal direction, means for forming a spreader channel of said dowel-like element in which said spreader wedge is inserted.

2. A matching seal element as claimed in claim 1, wherein said seal forming element is a shoulder extending inwardly at an open end of said cylindrically shaped part.

3. A matching seal element as claimed in claim 2, wherein said shoulder element is an annular bead.

4. A matching seal element as claimed in claim 1, wherein said terminal wall and said cylindrically shaped part are of an elastomeric material.

5. A matching seal element as claimed in claim 4, wherein said elastomeric material is neoprene.

6. A matching seal element as claimed in claim 4, wherein said elastomeric material is styrene butadiene rubber.

7. A matching seal element as claimed in claim 1, further comprising:

lamella-like webs joining said sealing rings to one another to permit selective removal of ones of said sealing rings from said terminal wall.

8. A matching seal element as claimed in claim 1, wherein said seal forming element of said cylindrically shaped part is an annular channel.

9. A matching seal element as claimed in claim 1, wherein said clamp means comprises bead-shaped closure elements extending along said longitudinal slot, said bead-shaped closure elements being under-cut and wedge-shaped, and a clamp rail that spans said bead-shaped closure elements.

10. A matching seal element as claimed in claim 1, wherein said clamp means comprises two closure elements at opposite sides of said radial slot formed wedge-shaped in a longitudinal direction and a clamp rail mounted on said two closure elements to hold said closure elements in abutment.

11. A matching seal element as claimed in claim 1, wherein said means for securing said raised beads together include clamping screw elements mounted to exert a clamping force on said raised beads toward one another.

12. A matching seal element as claimed in claim 1, wherein said clamp means for closing said radial slot comprises all around tightening straps extending about said cylindrically shaped part.

13. A matching seal element as claimed in claim 12, wherein said all around tightening straps are mounted at both ends of said cylindrically shaped part.

14. A matching seal element as claimed in claim 12, wherein said clamp means further comprises snap-on closures on said all around tightening straps for tightening.

15. A matching seal element as claimed in claim 1, wherein said means for securing said raised beads together includes a clamping wedge mounted bearing against one of said raised beads.

16. A matching seal element as claimed in claim 1, wherein said means for securing said raised beads together includes a tong-shaped clamp element arranged over bead-shaped closure elements, said tong-shaped clamp element includes a fixing element mounted on said tong-shaped clamp element to hold said clamp element closed.

17. A matching seal element as claimed in claim 1, wherein said means for securing said raised beads together comprises a clamping toggle closure extending over said raised beads.

18. A matching seal element as claimed in claim 1, further comprising:
additional sealants in sealing regions of said radial slot, said terminal wall and said seal forming element.

19. A matching seal element as claimed in claim 18, wherein said additional sealants are a sealing paste consisting essentially of a mixture of polyisobutylene, butyl rubber and suitable additives.

20. A matching seal element as claimed in claim 1, wherein said cylindrically shaped part includes deformable regions.

21. A matching seal element as claimed in claim 1, wherein said cylindrically shaped part is of a length sufficient to define a receptacle space between said seal forming element on one side and said terminal wall at another side.

22. A matching seal element as claimed in claim 1, further comprising:
means for clamping said receptacle means into said introduction opening.

23. A matching seal element as claimed in claim 1, further comprising:
a spreader wedge mounted in said dowel-like element to spread said dowel-like element in said introduction opening.

24. A matching seal element for closing an opening into which a cable passes and forming a seal between the cable and the opening, comprising:
a cylindrical closed terminal wall formed of interconnected seal rings, said seal rings being interconnected at one side of said terminal wall;
a cylindrically shaped wall part firmly integrated to said terminal wall so that said terminal wall closes one side of said cylindrically shaped wall part, said cylindrically shaped wall part defining a radial slot along a generated line and along said terminal wall, said cylindrically shaped part having an open end including a seal forming element; and
clamp means for closing said radial slot, said clamp means comprising raised beads formed integrally with said cylindrically shaped wall and extending along both sides of said radial slot, and means for securing said raised beads together to close said slot.

* * * * *